United States Patent
Lee

(10) Patent No.: US 11,566,613 B2
(45) Date of Patent: Jan. 31, 2023

(54) COMPRESSED AIR-BASED AUTONOMOUS POWER GENERATION SYSTEM FOR STAND-ALONE INDUSTRIAL ROBOT JIGS

(71) Applicant: SUN HST Co., Ltd., Ulsan (KR)

(72) Inventor: Jin Yong Lee, Ulsan (KR)

(*) Notice: Subject to any disclaimer, the term of this patent is extended or adjusted under 35 U.S.C. 154(b) by 1100 days.

(21) Appl. No.: 16/203,157

(22) Filed: Nov. 28, 2018

(65) Prior Publication Data

US 2019/0344455 A1 Nov. 14, 2019

(30) Foreign Application Priority Data

May 14, 2018 (KR) .................. 10-2018-0054805

(51) Int. Cl.
| | | |
|---|---|---|
| *H02J 7/14* | (2006.01) | |
| *H02J 7/00* | (2006.01) | |
| *F03D 9/11* | (2016.01) | |
| *F04B 41/02* | (2006.01) | |
| *B23K 9/10* | (2006.01) | |
| *B25J 15/00* | (2006.01) | |
| *B25J 19/00* | (2006.01) | |
| *F04B 35/04* | (2006.01) | |

(Continued)

(52) U.S. Cl.
CPC ............ *F04B 41/02* (2013.01); *B23K 9/1006* (2013.01); *B25J 15/0019* (2013.01); *B25J 19/005* (2013.01); *F03D 9/11* (2016.05); *F04B 35/04* (2013.01); *F15B 1/024* (2013.01); *F15B 1/027* (2013.01); *F15B 1/033* (2013.01); *H02J 7/0048* (2020.01); *H02J 7/1438* (2013.01); *H02J 7/00032* (2020.01)

(58) Field of Classification Search
CPC ... B25J 19/005; B25J 15/0019; B23K 9/1006; F03D 9/11; H02J 7/0047; H02J 7/1438
See application file for complete search history.

(56) References Cited

U.S. PATENT DOCUMENTS 4,229,661 A * 10/1980 Mead .................. F03D 9/32
290/55
5,606,233 A * 2/1997 Davis .................. B60L 50/15
180/65.265

(Continued)

FOREIGN PATENT DOCUMENTS

JP 2016-050619 4/2016

OTHER PUBLICATIONS

English Specification of 2016-050619.

*Primary Examiner* — Pedro J Cuevas
(74) *Attorney, Agent, or Firm* — Antonio Ha & U.S. Patent, LLC

(57) ABSTRACT

According to an embodiment, an compressed air-based autonomous power generation system for a standalone industrial robot jig comprises an air compressor configured to supply compressed air, a compressed air-based power generator detachably connected with the air compressor to produce power and deliver the compressed air, an industrial robot jig connected with the compressed air-based power generator to receive the compressed air and clamp a product, a battery connected with the compressed air-based power generator to receive, and be charged with, the power, and to supply the power to the industrial robot jig, and an auxiliary air tank connected with the compressed air-based power generator to store the compressed air.

7 Claims, 10 Drawing Sheets

(51) Int. Cl.
*F15B 1/027* (2006.01)
*F15B 1/033* (2006.01)
*F15B 1/02* (2006.01)

(56) References Cited

U.S. PATENT DOCUMENTS

| | | | | |
|---|---|---|---|---|
| 6,054,838 | A * | 4/2000 | Tsatsis | F02C 6/14 |
| | | | | 290/55 |
| 7,828,091 | B2 * | 11/2010 | Wedderburn, Jr. | F03D 13/10 |
| | | | | 180/2.2 |
| 8,890,342 | B2 * | 11/2014 | Alenezi | H02K 53/00 |
| | | | | 290/1 A |
| 9,550,624 | B2 * | 1/2017 | Khodl | B25J 5/007 |
| 9,688,472 | B1 * | 6/2017 | Stubbs | G06Q 10/087 |
| 9,776,492 | B2 * | 10/2017 | Chen | B60K 6/00 |
| 9,785,911 | B2 * | 10/2017 | Galluzzo | B25J 5/007 |
| 9,940,604 | B2 * | 4/2018 | Galluzzo | G06Q 10/087 |
| 9,987,748 | B2 * | 6/2018 | Stubbs | B25J 9/1679 |
| 10,147,069 | B2 * | 12/2018 | Galluzzo | B25J 15/0616 |
| 10,286,967 | B2 * | 5/2019 | Kim | B23K 11/11 |
| 10,322,506 | B2 * | 6/2019 | Ding | B25J 9/1656 |
| 10,464,621 | B2 * | 11/2019 | Lee | B62D 65/022 |
| 10,500,735 | B1 * | 12/2019 | Menon | B25J 15/0475 |
| 10,940,999 | B2 * | 3/2021 | Kalouche | B25J 9/1612 |
| 11,090,816 | B2 * | 8/2021 | Menon | B25J 15/0061 |
| 11,203,386 | B2 * | 12/2021 | Lee | B62D 65/18 |
| 2006/0022632 | A1 * | 2/2006 | Tsatsis | H02J 7/1415 |
| | | | | 320/104 |
| 2009/0301796 | A1 * | 12/2009 | Wedderburn, Jr. | F03D 9/11 |
| | | | | 180/2.2 |
| 2009/0309371 | A1 * | 12/2009 | Ballard | F03G 7/10 |
| | | | | 290/1 R |
| 2010/0013177 | A1 * | 1/2010 | Horn, Jr. | B62B 5/0013 |
| | | | | 280/47.24 |
| 2014/0049047 | A1 * | 2/2014 | Alenezi | H02K 7/1823 |
| | | | | 290/52 |
| 2014/0091736 | A1 * | 4/2014 | Chen | H02J 7/1415 |
| | | | | 318/3 |
| 2017/0297200 | A1 * | 10/2017 | Stubbs | B25J 9/1682 |
| 2018/0043475 | A1 * | 2/2018 | Lee | B23K 31/02 |
| 2018/0057263 | A1 * | 3/2018 | Beer | B25J 15/0616 |
| 2018/0065693 | A1 * | 3/2018 | Lee | B23K 37/0435 |
| 2018/0065694 | A1 * | 3/2018 | Lee | B62D 65/026 |
| 2018/0117718 | A1 * | 5/2018 | Rajagopalan | B23K 9/0284 |
| 2018/0162470 | A1 * | 6/2018 | Kim | B62D 65/02 |
| 2019/0291955 | A1 * | 9/2019 | Bastian, II | B65G 1/1373 |
| 2020/0055149 | A1 * | 2/2020 | Lee | B23K 31/02 |
| 2020/0070361 | A1 * | 3/2020 | Menon | B25J 15/0061 |
| 2020/0094997 | A1 * | 3/2020 | Menon | B65B 57/14 |
| 2020/0130760 | A1 * | 4/2020 | Lee | B62D 65/026 |
| 2021/0032030 | A1 * | 2/2021 | Kalouche | B25J 15/0061 |
| 2021/0032031 | A1 * | 2/2021 | Kalouche | B25J 15/0061 |
| 2021/0032032 | A1 * | 2/2021 | Kalouche | B25J 19/005 |
| 2021/0032033 | A1 * | 2/2021 | Kalouche | B25J 15/0616 |
| 2021/0032034 | A1 * | 2/2021 | Kalouche | B25J 9/1689 |
| 2021/0094637 | A1 * | 4/2021 | Kang | B23K 37/047 |
| 2021/0147148 | A1 * | 5/2021 | Kalouche | B25J 9/1612 |
| 2021/0221375 | A1 * | 7/2021 | Kattoju | B60L 50/30 |
| 2021/0339403 | A1 * | 11/2021 | Menon | B25J 15/0408 |
| 2022/0024533 | A1 * | 1/2022 | Jeong | B62D 65/18 |
| 2022/0073158 | A1 * | 3/2022 | Lee | B23K 37/0443 |

* cited by examiner

Schematic symbol

COMPRESSED AIR-BASED AUTONOMOUS POWER GENERATION SYSTEM FOR STAND-ALONE INDUSTRIAL ROBOT JIGS

CROSS-REFERENCE TO RELATED APPLICATION(S)

This application is based on and claims priority under 35 U.S.C. § 119 to Korean Patent Application No. 10-2018-0054805, filed on May 14, 2018, in the Korean Intellectual Property Office, the disclosure of which is incorporated by reference herein in its entirety.

TECHNICAL FIELD

Various embodiments of the disclosure relate to a compressed air-based autonomous power generation system for stand-alone industrial robot jigs.

DISCUSSION OF RELATED ART

Industrial robot jigs used in automobile industry play a role as an assistant means in welding or assembling automobile bodies to quickly and precisely place the car bodies in desired positions.

Such an industrial robot jig needs a power feeder and an air feeder to operate, and power and air are required to be supplied before the robot begins welding or assembly. While one industrial robot jig carries out several tasks, the power feeder and the air feeder frequently couple or uncouple.

In the case of air feeding, once air is initially injected to operate the solenoid valve, the air pressure may remain even after the air supply is released, and thus, when the air supply resumes, the robot may immediately perform its task without no or little delay.

Power feeding, however, comes to a different conclusion due to the need for supplying power to the control device. That is, since the robot may initiate to work several seconds after the supply of power, the processing may be delayed.

Further, wiring and installation for power feeding take much time and efforts. Therefore, a need exists for a way to address such issues of the prior art.

SUMMARY

According to an embodiment, an compressed air-based autonomous power generation system for a standalone industrial robot jig comprises an air compressor configured to supply compressed air, a compressed air-based power generator detachably connected with the air compressor to produce power and deliver the compressed air, an industrial robot jig connected with the compressed air-based power generator to receive the compressed air and clamp a product, a battery connected with the compressed air-based power generator to receive, and be charged with, the power, and to supply the power to the industrial robot jig, and an auxiliary air tank connected with the compressed air-based power generator to store the compressed air.

The compressed air-based power generator, the battery, and the auxiliary air tank may be installed in the industrial robot jig to be moved along with the industrial robot jig along a processing line.

The compressed air-based autonomous power generation system may further comprise a controller is configured to charge the battery with the power from the compressed air-based power generator and inject the compressed air into the industrial robot jig and the auxiliary air tank before the industrial robot jig clamps the product.

The compressed air-based power generator may include a generator rotated by the compressed air to produce the power and an electronic solenoid valve configured to deliver, or stop from delivering, the compressed air to the auxiliary air tank.

The industrial robot jig may include a remaining battery indicator configured to display or transmit remaining power of the battery and an air pressure indicator configured to display and transmit a pressure of the auxiliary air tank.

The compressed air-based autonomous power generation system may comprise a router configured to receive and transfer information about the remaining power of the battery and the pressure of the auxiliary air tank, a mobile device configured to receive the information about the remaining power of the battery and the pressure of the auxiliary air tank, and a monitoring computer configured to receive and monitor the information about the remaining power of the battery and the pressure of the auxiliary air tank.

The controller may be configured to transmit a notification signal to the mobile device and the monitoring computer when the remaining power of the battery or the pressure of the auxiliary air tank is smaller than a first reference value.

The controller may be configured to open the electronic solenoid valve to allow the compressed air-based power generator to produce the power and charge the battery with the power and to allow the compressed air to be injected into the auxiliary air tank when the remaining power of the battery or the pressure of the auxiliary air tank is smaller than a first reference value.

The controller may be configured to close the electronic solenoid valve to stop the compressed air-based power generator from producing the power and to prevent the compressed air from being injected into the auxiliary air tank when the remaining power of the battery or the pressure of the auxiliary air tank is larger than a second reference value.

The industrial robot jig may include a solenoid block connected with the battery and the compressed air-based power generator to determine whether to deliver the compressed air with the power from the battery and at least one pneumatic actuator connected with the solenoid block to determine whether to clamp the product.

The compressed air-based autonomous power generation system may further comprise a welding robot configured to weld the product clamped by the industrial robot jig.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
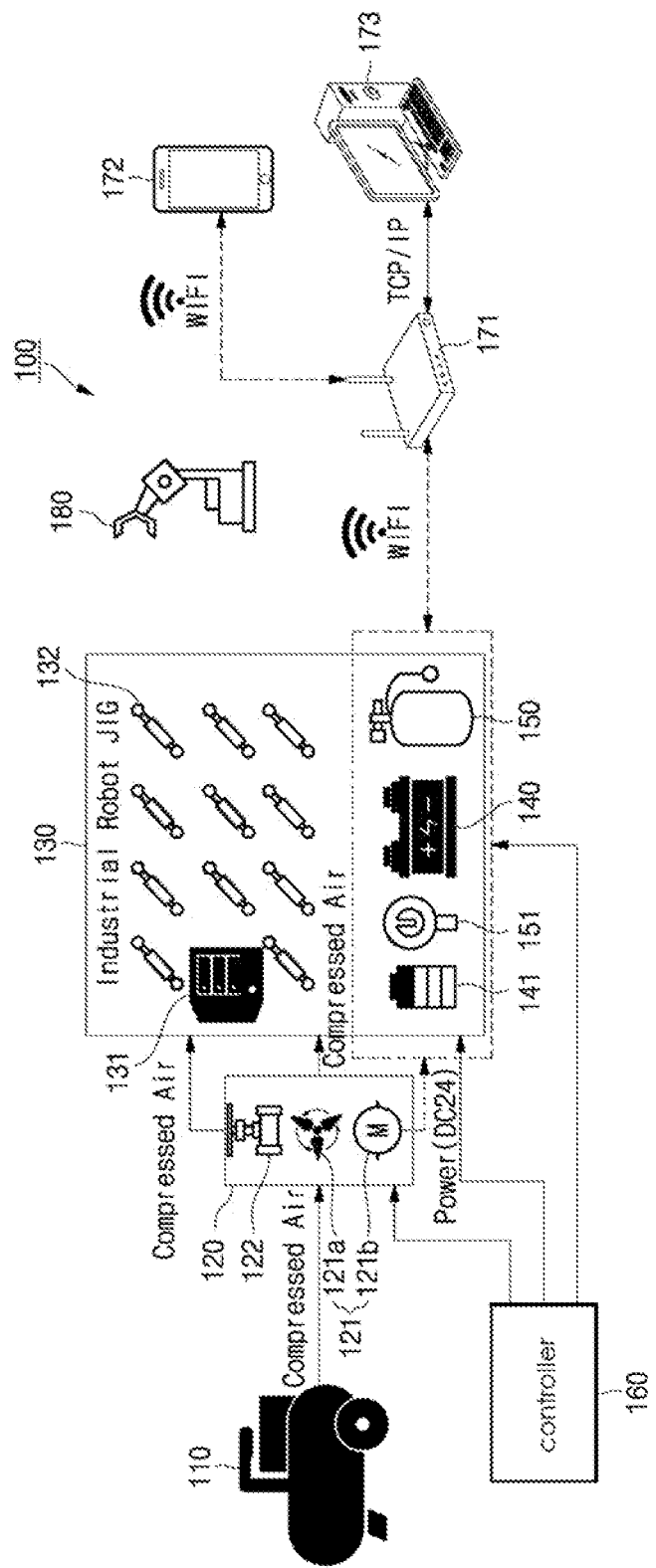
FIG. 1 is a block diagram illustrating a configuration of a compressed air-based autonomous power generation system for a stand-alone industrial robot jig, according to an embodiment.

Hereinafter, embodiments of the present invention are described in detail with reference to the accompanying drawings.

Embodiments of the disclosure are provided to thoroughly explain the disclosure to those skilled in the art, and various modifications may be made thereto, and the scope of the present invention is not limited thereto. Embodiments of the disclosure are provided to fully and thoroughly convey the spirit of the present invention to those skilled in the art.

As used herein, the singular forms "a," "an," and "the" are intended to include the plural forms as well, unless the context clearly indicates otherwise.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the present invention. As used herein, the singular forms "a," "an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

The terms "beneath," "below," "lower," "under," "above," "upper," "on," or other terms to indicate a position or location may be used for a better understanding of the relation between an element or feature and another as shown in the drawings. However, embodiments of the present invention are not limited thereby or thereto. For example, where a lower element or an element positioned under another element is overturned, then the element may be termed as an upper element or element positioned above the other element. Thus, the term "under" or "beneath" may encompass, in meaning, the term "above" or "over."

As described herein, the controller and/or other related devices or parts may be implemented in hardware, firmware, application specific integrated circuits (ASICs), software, or a combination thereof. For example, the controller and/or other related devices or parts or its or their components may be implemented in a single integrated circuit (IC) chip or individually in multiple IC chips. Further, various components of the controller may be implemented on a flexible printed circuit board, in a tape carrier package, on a printed circuit board, or on the same substrate as the controller. Further, various components of the controller may be processes, threads, operations, instructions, or commands executed on one or more processors in one or more computing devices, which may execute computer programming instructions or commands to perform various functions described herein and interwork with other components. The computer programming instructions or commands may be stored in a memory to be executable on a computing device using a standard memory device, e.g., a random access memory (RAM). The computer programming instructions or commands may be stored in, e.g., a compact-disc read only memory (CD-ROM), flash drive, or other non-transitory computer readable media. It will be appreciated by one of ordinary skill in the art that various functions of the computing device may be combined together or into a single computing device or particular functions of a computing device may be distributed to one or other computing devices without departing from the scope of the present invention.

As an example, the controller of the present invention may be operated on a typical commercial computer including a central processing unit, a hard disk drive (HDD) or solid state drive (SSD) or other high-volume storage, a volatile memory device, a keyboard, mouse, or other input devices, and a monitor, printer, or other output devices.

FIG. 1 is a block diagram illustrating a configuration of a compressed air-based autonomous power generation system 100 for a stand-alone industrial robot jig, according to an embodiment.

Referring to FIG. 1, a compressed air-based autonomous power generation system 100 for a stand-alone industrial robot jig may include an air compressor 110, an compressed air-based power generator 120, an industrial robot jig 130, a battery 140, and an auxiliary air tank 150.

According to an embodiment, the compressed air-based autonomous power generation system 100 may further include a controller 160. According to an embodiment, the compressed air-based autonomous power generation system 100 may further include at least one of a remaining battery indicator 141 or an air pressure indicator 151. According to an embodiment, the compressed air-based autonomous power generation system 100 may further include a router 171, a mobile device 172, or a monitoring computer 173. According to an embodiment, the compressed air-based autonomous power generation system 100 may further include a welding robot 180.

The air compressor 110 may generate compressed air and deliver the compressed air to the compressed air-based power generator 120. The air compressor 110 may freely be combined with or removed from the compressed air-based power generator 120. For example, the compressed air-based power generator 120 may be installed with the industrial robot jig 130. The industrial robot jig 130 may move and stop along for each process along the processing line. When the industrial robot jig 130 stops, the air compressor 110 may be connected to the compressed air-based power generator 120. When the industrial robot jig 130 moves, the air compressor 110 may be removed from the compressed air-based power generator 120.

The compressed air-based power generator 120 may be detachably connected with the air compressor 110 to produce power and deliver compressed air. As an example, the compressed air may be delivered to each of the industrial robot jig 130 and the auxiliary air tank 150.

The compressed air-based power generator 120 may include a generator 121 and an electronic solenoid valve 122. The generator 121 may be rotated by the compressed air, generating power and charging the battery 140 with the power. The electronic solenoid valve 122 may delivery the compressed air to the auxiliary air tank 150 or cut off the supply of the compressed air to the auxiliary air tank 150.

The generator 121 may include multiple blades 121a with a rotational shaft and a motor 121b connected to the rotational shaft. The motor 121b may also be a power generator.

The industrial robot jig 130 may be connected to the compressed air-based power generator 120, receiving the compressed air to clamp or unclamp the product. The compressed air-based power generator 120, the battery 140, and the auxiliary air tank 150 may be installed along with the industrial robot jig 130 and be moved along with the industrial robot jig 130 along the processing line. The remaining battery indicator 141 and the air pressure indicator 151 may also be installed together with the industrial robot jig 130 and be moved along with the industrial robot jig 130 along the processing line.

The industrial robot jig 130 may include a solenoid block 131 and multiple pneumatic actuators 132. The solenoid block 131 may be connected with the battery 140 and the compressed air-based power generator 120 and determine whether the compressed air is delivered with the power from the battery 140. The pneumatic actuators 132 may be connected with the solenoid block 131, clamping or unclamping the product. As an example, the solenoid block 131 may be individually controlled by the controller 160.

The battery 140 may be connected with the compressed air-based power generator 120, receive, and be charged with, power from the compressed air-based power generator 120, and supply power to the industrial robot jig 130. The battery 140 includes the remaining battery indicator 141. The battery 140 may display the remaining power of the battery 140 and wirelessly send out the remaining power (e.g., remaining battery power information) of the battery 140.

The auxiliary air tank 150 may be connected with the compressed air-based power generator 120 and store compressed air. The auxiliary air tank 150 includes the air pressure indicator 151. The auxiliary air tank 150 may display the pressure of the auxiliary air tank 150 and wirelessly send out the pressure (e.g., pressure information).

The controller 160 perform control to charge the battery 140 with the power from the compressed air-based power generator 120 and inject the compressed air to the industrial robot jig 130 and the auxiliary air tank 150 before a product (e.g., a material to be welded) is clamped by the pneumatic actuators 132 of the industrial robot jig 130.

The router 171 may receive and transmit, to the outside, information about the remaining power of the battery 140 and the pressure of the auxiliary air tank 150 via wireless communication, such as wireless-fidelity (Wi-Fi), Zigbee, or Bluetooth.

The mobile device 172 may receive the information about the remaining power of the battery 140 and the pressure of the auxiliary air tank 150 from the router 171 via wireless communication, such as wide-angle image, Zigbee, or Bluetooth, and display the information to the user.

The monitoring computer 173 may receive the information about the remaining power of the battery 140 and the pressure of the auxiliary air tank 150 from the router 171 in a wireless scheme, e.g., transmission control protocol (TCP)/Internet protocol (IP), but not limited thereto, and monitor, display, and store the information.

The welding robot 180 may be installed along the processing line, and the welding robot 180 may weld the product clamped by the industrial robot jig 130. Embodiments of the disclosure are not limited to the welding robot 180, and embodiments of the disclosure may be applied to other various robots, such as robots for combining, assembling, or inspecting products.

According to an embodiment, where the remaining power of the battery 140 or the pressure of the auxiliary air tank 150 is smaller than a preset first reference value, the controller 160 may transmit a notification signal through the router 171 to the mobile device 172 and/or the monitoring computer 173.

For example, the controller 160 may transmit a control signal to the remaining battery indicator 141 or the air pressure indicator 151 to enable the remaining battery indicator 141 or the air pressure indicator 151 to transmit a notification signal through the router 171.

Thus, the user may realize whether the battery 140 needs change or whether there is an abnormality in the auxiliary air tank 150 in real-time, through the mobile device 172, e.g., a smartphone, or the monitoring computer 173.

According to an embodiment, where the remaining power of the battery 140 or the pressure of the auxiliary air tank 150 is smaller than the preset first reference value, the controller 160 may perform control to open the electronic solenoid valve 122 to allow the compressed air-based power generator 120 to produce power and charge the battery 140 and to allow the pressured air to be injected into the auxiliary air tank 150.

Thus, according to an embodiment, where the remaining power of the battery 140 is relatively small, the electronic solenoid valve 122 may automatically be opened to allow the generator 121 to be operated by the compressed air, so that the battery 140 is automatically charged. Thus, the industrial robot jig 130 may remain fed power from the battery 140.

According to an embodiment, where the remaining power of the battery 140 or the pressure of the auxiliary air tank 150 is larger than a preset second reference value, the controller 160 may perform control to close the electronic solenoid valve 122 to allow the compressed air-based power generator 120 to stop producing power to prevent the battery 140 form being charged and to prevent the pressured air from being injected into the auxiliary air tank 150. The second reference value may he larger than the first reference value.

Thus, according to an embodiment, the battery 140 may remain in a proper remaining power level without being over-charged, thus prevented from a reduction in its life span.

As such, according to an embodiment, in the compressed air-based autonomous power generation system 100 for a standalone industrial robot jig, the industrial robot jig 130 has the battery 140 on its own and may be self-power generated by compressed air to charge the battery 140. For example, in the compressed air-based autonomous power generation system 100 for a standalone industrial robot jig, the industrial robot jig 130 may be equipped with the battery 140, the auxiliary air tank 150, and a communication module, be freely moved, and charge the battery 140 with power self-generated. Specifically, in the compressed air-based autonomous power generation system 100 for a standalone industrial robot jig may include the compressed air-based generator 121. The compressed air-based autonomous power generation system 100 is based on energy harvesting by the torque using electric power generated upon rotating the motor 121b of the generator 121 by compressed air (i.e., converting kinetic energy into electrical energy), charges the battery 140 with the generated power, and enables the battery 140 to be autonomously charged when the battery 140 is discharged.

Figure 2:
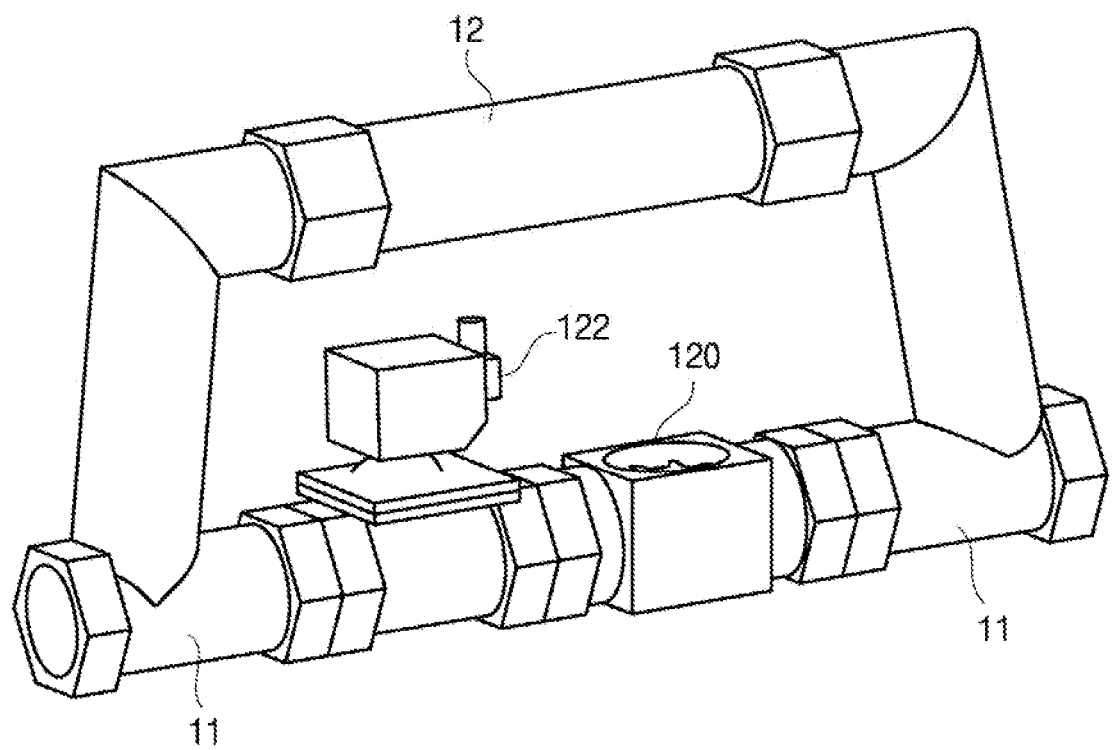
FIG. 2 is a view schematically illustrating a compressed air-based power generator with an electronic solenoid valve in a compressed air-based autonomous power generation system for a stand-alone industrial robot jig according to an embodiment.

FIG. 2 is a concept view illustrating a compressed air-based power generator 120 including an electronic solenoid valve 122 in an compressed air-based autonomous power generation system 100 of a standalone industrial robot jig according to an embodiment.

Referring to FIG. 2, in the case of a single stationary industrial robot jig which does not move along the processing line, as an example, the electronic solenoid valve 122 is automatically or manually set to be closed, and compressed air may directly be supplied through an air circulation pipe (direct injection) that does not drive the compressed air-based power generator 120.

In other words, the electronic solenoid valve 122 and the compressed air-based power generator 120 may be installed on a first air circulation pipe 11, and a second air circulation pipe 12, as a bypass pipe, may be installed outside the electronic solenoid valve 122 and the compressed air-based power generator 120. The electronic solenoid valve 122 may automatically or manually be closed, allowing the compressed air to be supplied through the second air circulation pipe 12.

Figure 3A:
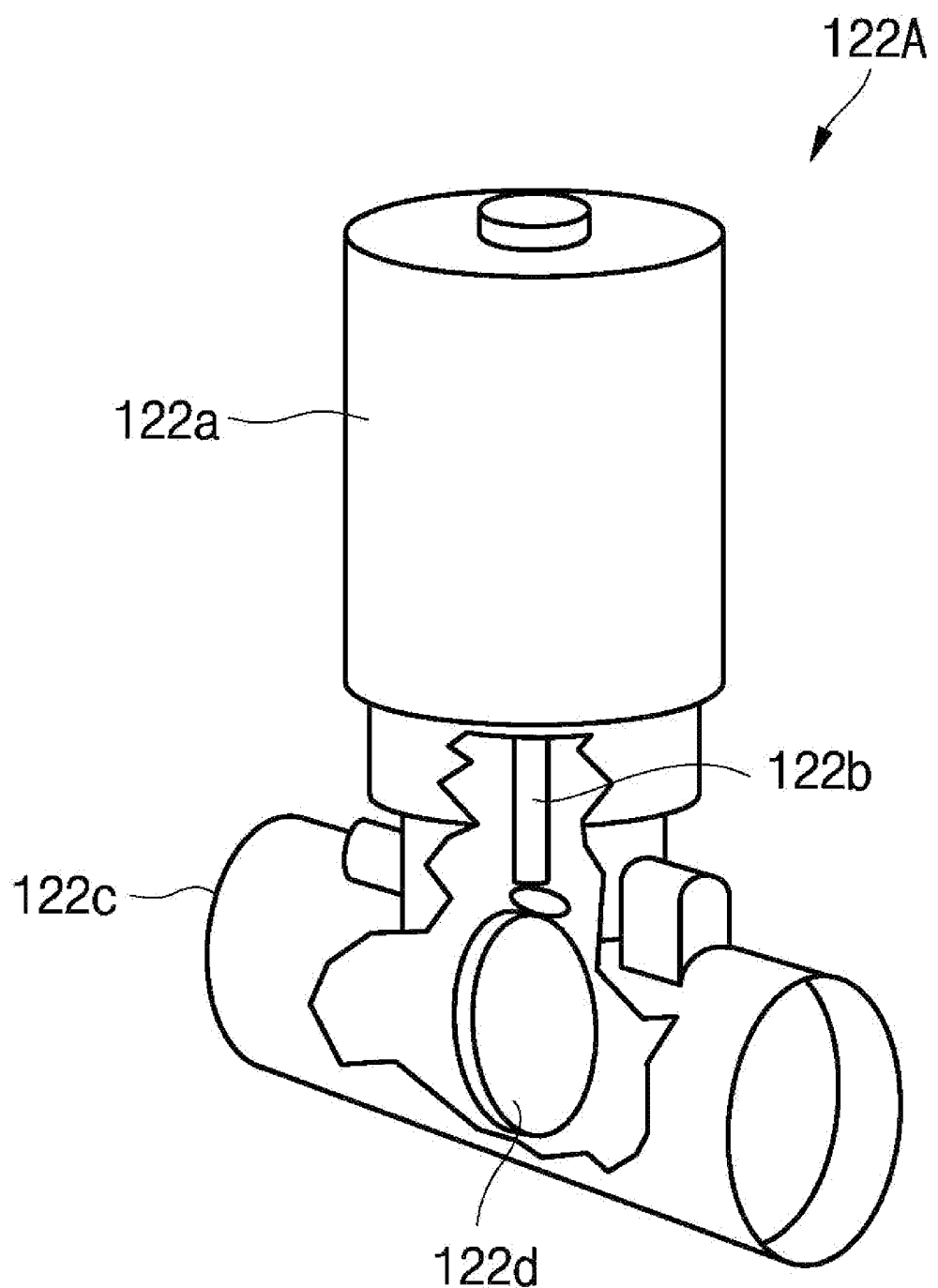
FIGS. 3a and 3b are views schematically illustrating an electronic solenoid valve in an compressed air-based autonomous power generation system for a stand-alone industrial robot jig according to an embodiment.
Figure 3B:
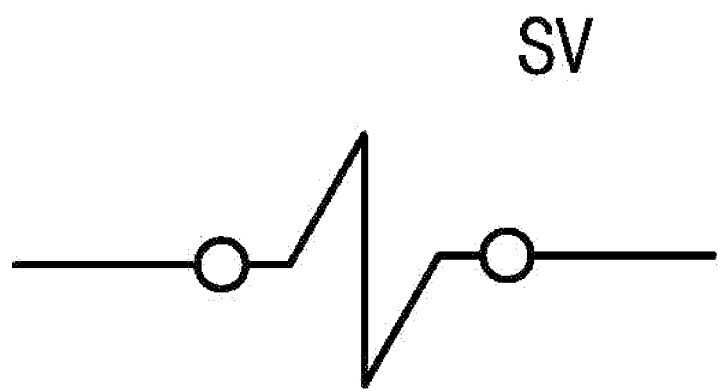

FIGS. 3a and 3b are views schematically illustrating an electronic solenoid valve 122A in an compressed air-based autonomous power generation system 100 for a stand-alone industrial robot jig according to an embodiment.

Referring to FIGS. 3a and 3b, as an example but without being limited thereto, an electronic solenoid valve 122A may include a solenoid 122a, a rod 122b moving back and forth from the solenoid 122a, a pipe 122c coupled to one end of the solenoid 122a, and a butterfly valve 122d whose angle is adjusted as the rod 122b moves back and forth to open or close the pipe 122c.

Figure 4A:
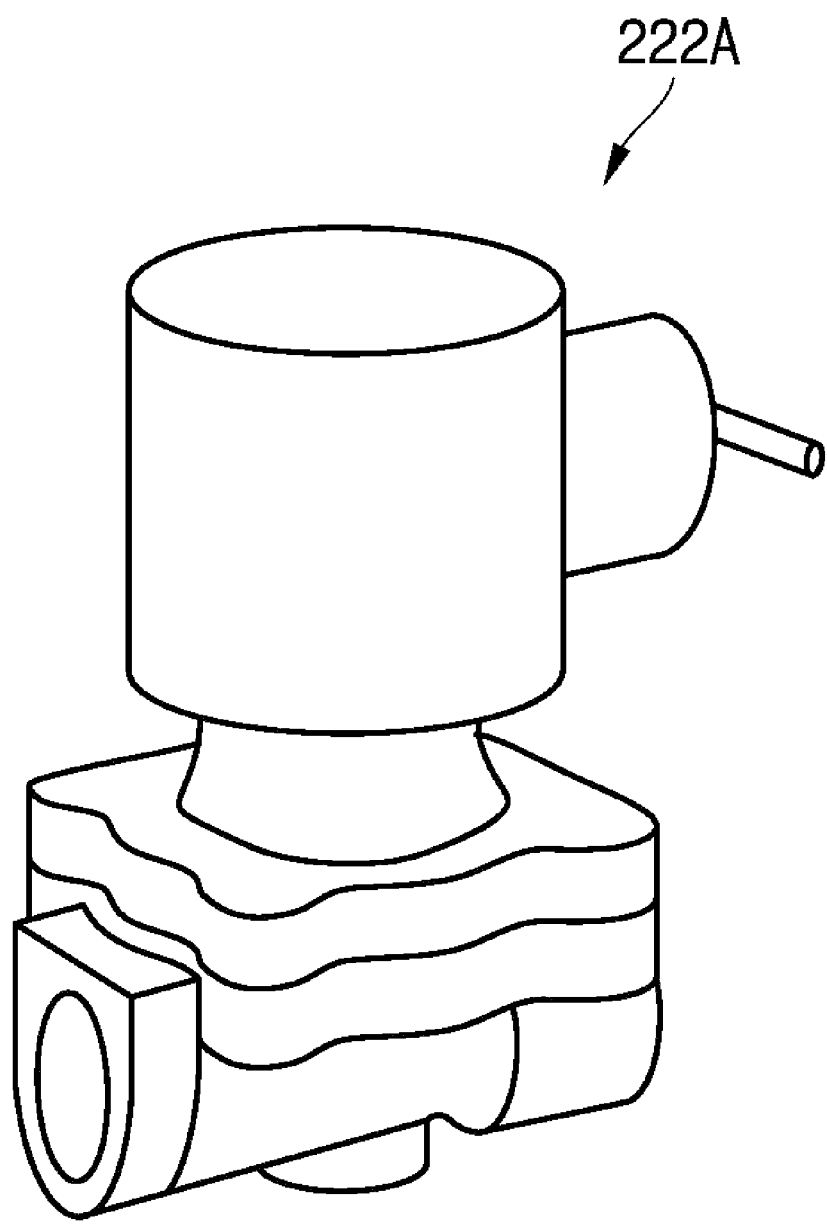
FIGS. 4a and 4b are views schematically illustrating an electronic solenoid valve in an compressed air-based autonomous power generation system for a stand-alone industrial robot jig according to an embodiment.
Figure 4B:
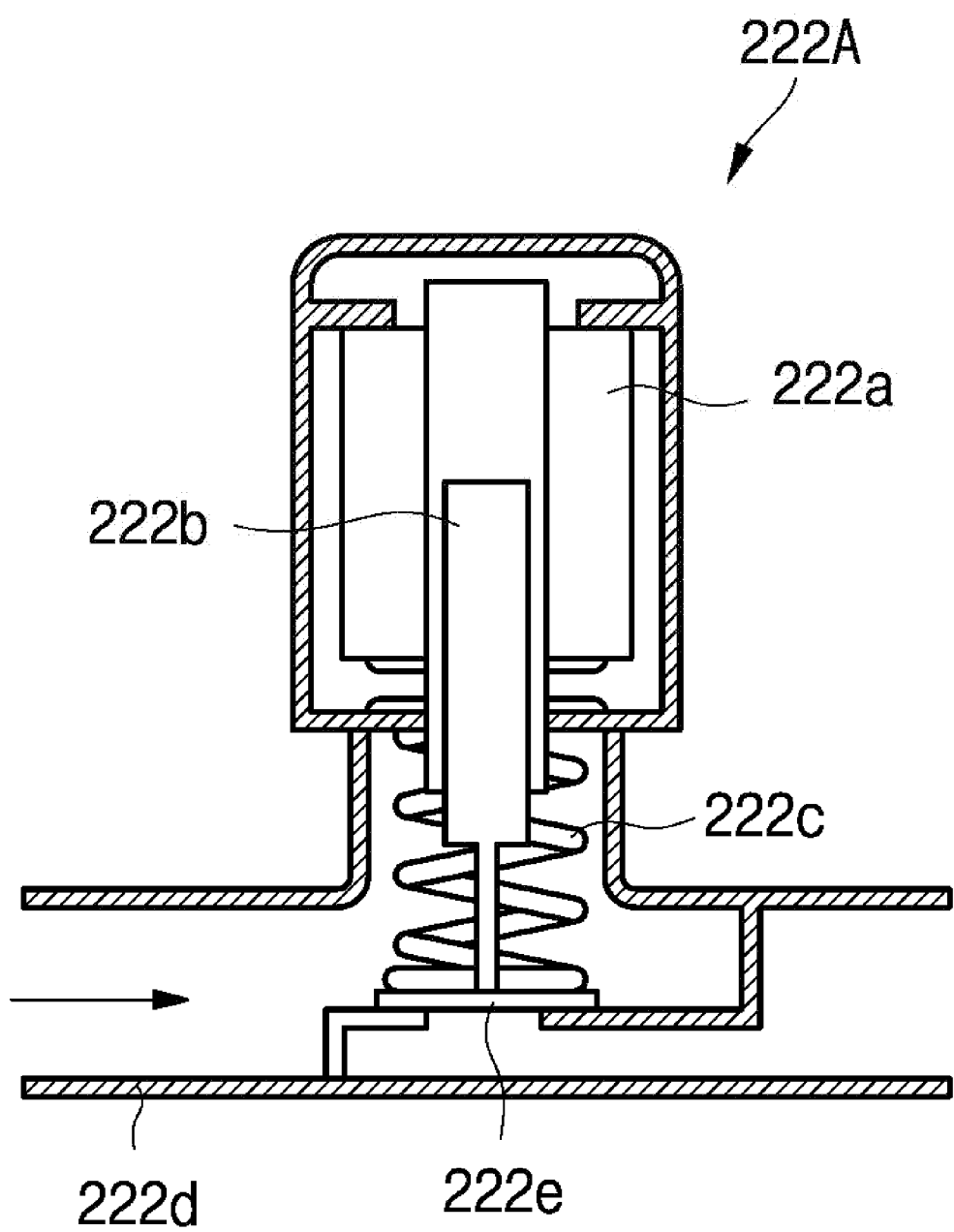

FIGS. 4a and 4b are views schematically illustrating an electronic solenoid valve 222A in an compressed air-based autonomous power generation system 100 for a stand-alone industrial robot jig according to an embodiment.

Referring to FIGS. 4a and 3b, as an example but without being limited thereto, an electronic solenoid valve 222A may include a solenoid 222a, a rod 222b moving back and forth from the solenoid 222a, a spring 222c coupled to the rod 222b, a pipe 222d coupled to one end of the solenoid 222a, and a valve 222e to open or close the pipe 222d by the rod 222b.

Figure 5:
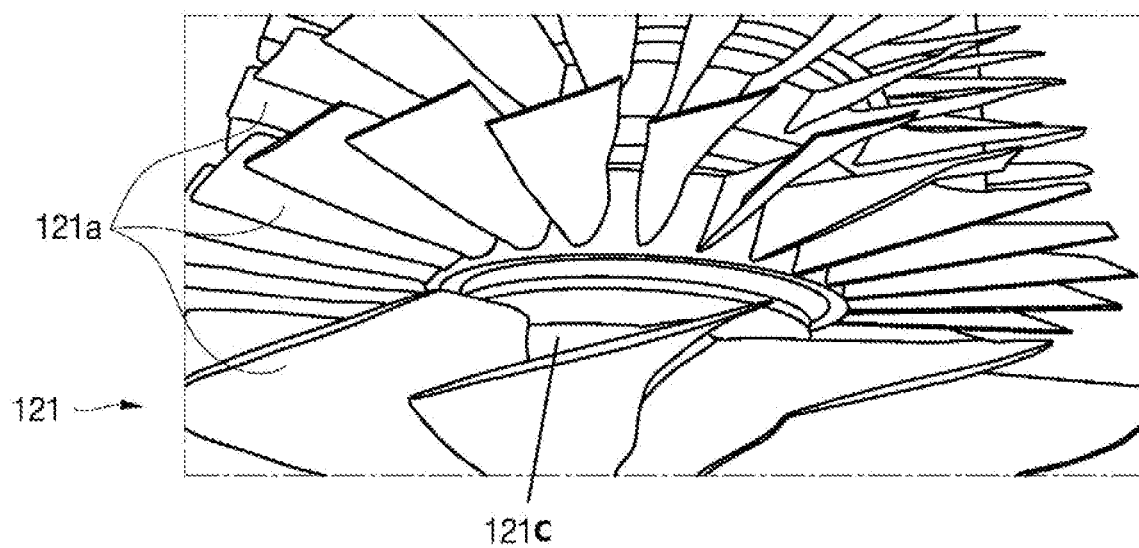
FIG. 5 is a view illustrating an example of a blade-type air pressure generator in a compressed air-based autonomous power generation system for a stand-alone industrial robot jig according to an embodiment.

FIG. 5 is a view illustrating an example of a blade-type a compressed air generator 121 in a compressed air-based autonomous power generation system 100 for a standalone industrial robot jig according to an embodiment. Referring to FIG. 5, the blade-type generator 121 may include a plurality of blades 121a substantially radially installed around a rotational shaft 121c. The blades 121a may be provided in a multi-layered structure so that the kinetic energy of compressed air may be delivered to the blades 121a at high efficiency to rotate the rotational shaft 121c. The rotational shaft 121c is coupled to a power generator (or motor).

Figure 6A:
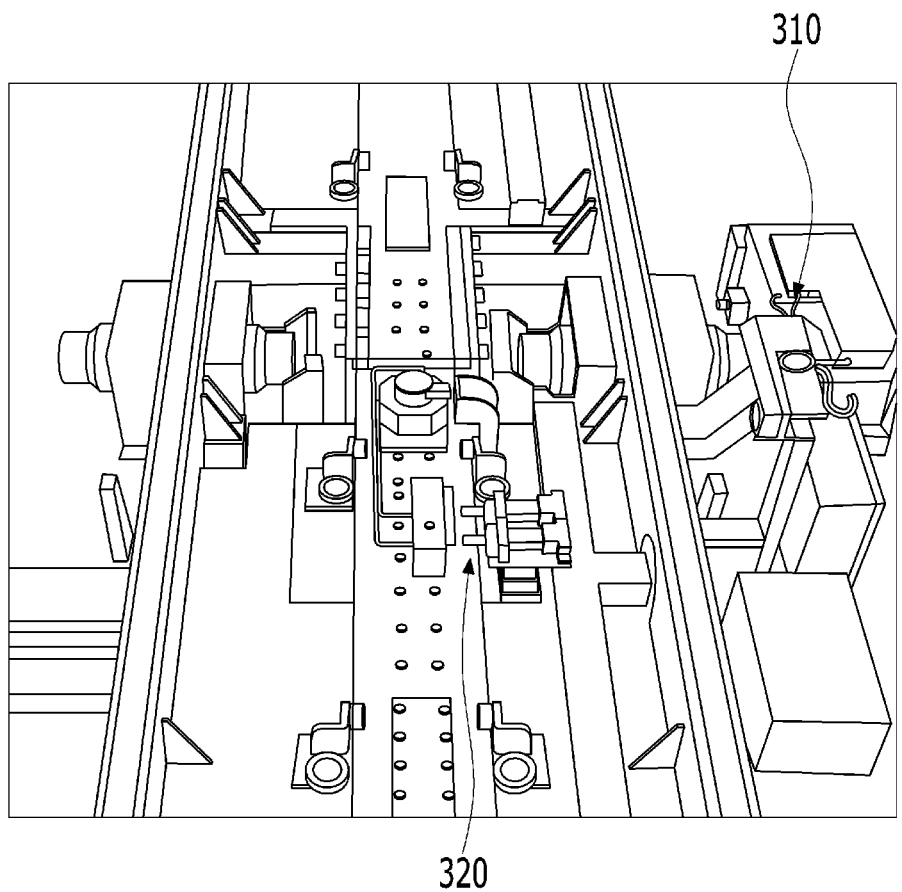
FIG. 6a is a view illustrating an example of a processing line according to the prior art.
Figure 6B:
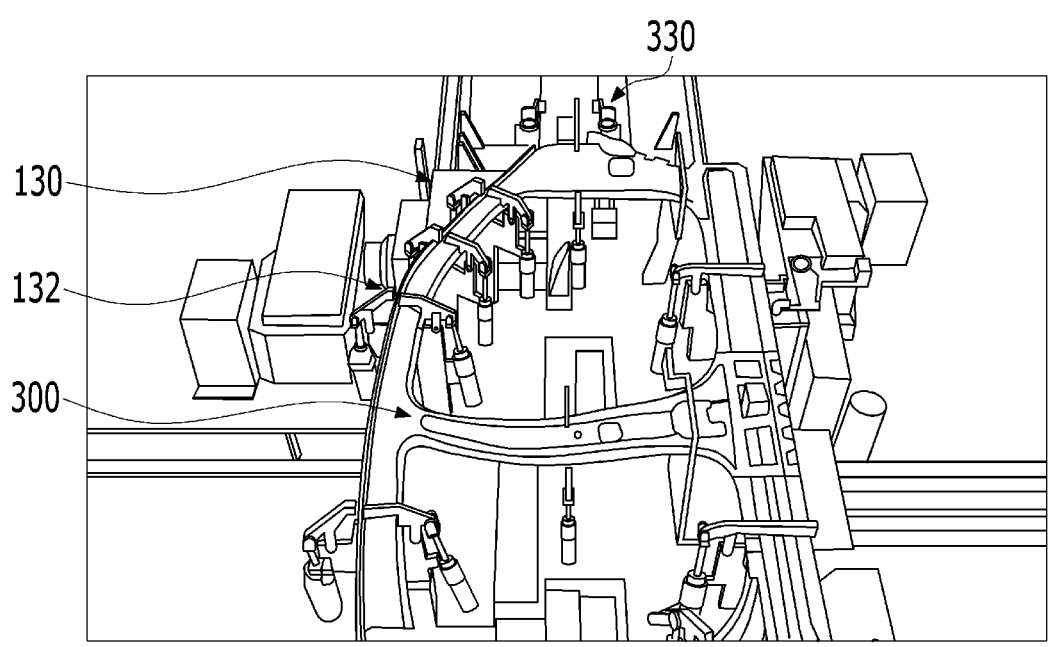
FIGS. 6b, and 6c are views illustrating a configuration and an operation example of a processing line, according to an embodiment.
Figure 6C:
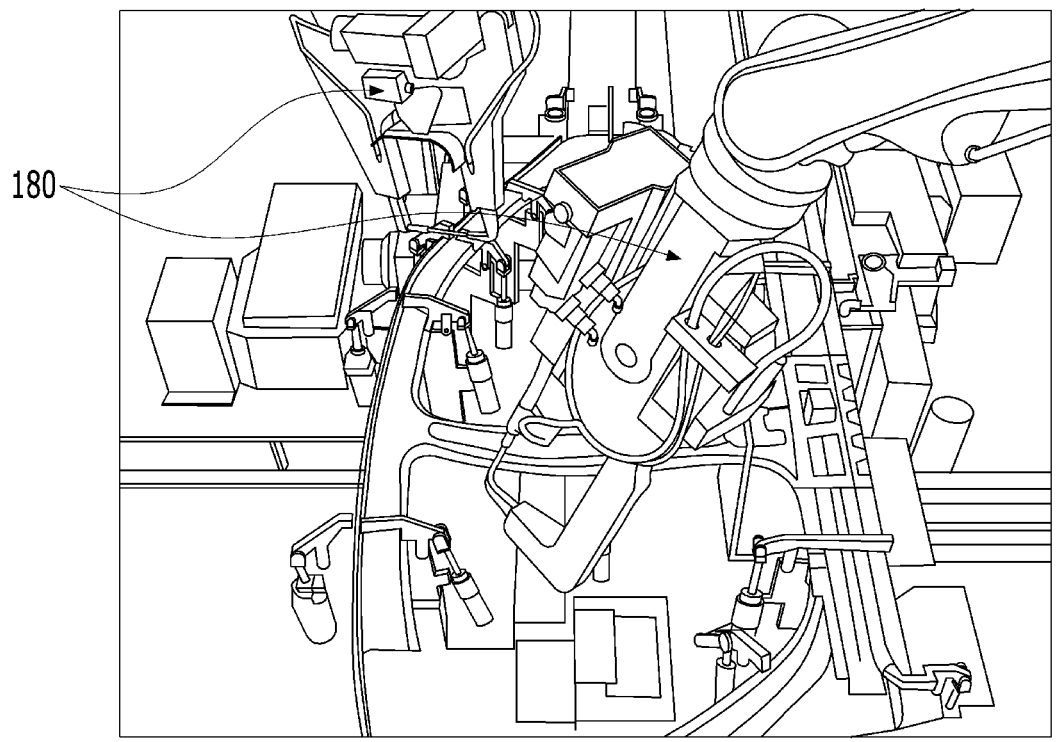

FIG. 6a is a view illustrating an example of a processing line according to the prior art. FIGS. 6b, and 6c are views illustrating a configuration and an operation example of a processing line, according to an embodiment.

Referring to FIG. 6a, according to the prior art, each processing line 330 requires a power feeder 310 for supplying electric power and an air feeder 320 for supplying air. However, embodiments of the disclosure eliminate the need for such a power feeder 310. For example, according to an embodiment, the industrial robot jig 130 may be equipped with the compressed air-based power generator 120 on its own to produce power using compressed air, store the produced power in the battery 140, and supply the power from the battery 140 to the industrial robot jig 130. As such, there is no need for a separate power feeder. Thus, the industrial robot jig 130 may quickly operate, thereby enhancing productability.

Referring to FIG. 6b, the industrial robot jig 130 may be moved along the processing line 330. The industrial robot jig 130 may be equipped with multiple pneumatic actuators 132 operated by the solenoid block 131. The pneumatic actuators 132 may clamp or unclamp a product 300, e.g., a target for welding.

Referring to FIG. 6c, at least one welding robot 180 may approach the product 300 and perform welding. Although the welding robot 180 is shown in FIG. 6c, this is merely an example, and other various robots, e.g., robots for combining, assembling, or inspecting products, may be replaced or added.

As described above, according to embodiments, the industrial robot jig may be equipped with a battery and be self-generated with compressed air to charge the battery. For example, according to an embodiment, the industrial robot jig includes a battery, an auxiliary air tank, and a communication module, be freely moved, and charge the battery with power self-generated. According to an embodiment, in the compressed air-based autonomous power generation system for a standalone industrial robot jig, which includes the compressed air-based generator and is based on energy harvesting by the torque using electric power generated upon rotating the motor of the generator by compressed air (i.e., converting kinetic energy into electrical energy), the battery may be charged with the power by the compressed air, and the battery may be autonomously charged when discharged.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A compressed air-based autonomous power generation system for a standalone industrial robot jig, comprising:
   an air compressor configured to supply compressed air;
   a compressed air-based power generator detachably connected with the air compressor to produce power and deliver the compressed air;
   an industrial robot jig connected with the compressed air-based power generator to receive the compressed air and clamp a product;

a battery connected with the compressed air-based power generator to receive, and be charged with, the power, and to supply the power to the industrial robot jig;

an auxiliary air tank connected with the compressed air-based power generator to store the compressed air; and a controller configured to charge the battery with power from the compressed air-based power generator and inject the compressed air into the industrial robot jig and the auxiliary air tank before the industrial robot jig clamps a product, wherein the compressed air-based power generator includes a generator rotated by the compressed air to produce the power and an electronic solenoid valve configured to deliver, or stop from delivering, the compressed air to the auxiliary air tank, wherein the controller is configured to open the electronic solenoid valve to allow the compressed air-based power generator to produce the power and autonomously charge the battery with the power and to allow the compressed air to be injected into the auxiliary air tank when the remaining power of the battery or the pressure of the auxiliary air tank is smaller than a first reference value and to close the electronic solenoid valve to stop the compressed air-based power generator from producing the power and to prevent the compressed air from being injected into the auxiliary air tank when the remaining power of the battery or the pressure of the auxiliary air tank is larger than a second reference value.

2. The compressed air-based autonomous power generation system of claim 1, wherein the compressed air-based power generator, the battery, and the auxiliary air tank are installed in the industrial robot jig to be moved along with the industrial robot jig along a processing line, and wherein the compressed air-based autonomous power generation system further comprises a controller is configured to charge the battery with the power from the compressed air-based power generator and inject the compressed air into the industrial robot jig and the auxiliary air tank before the industrial robot jig clamps the product.

3. The compressed air-based autonomous power generation system of claim 1, wherein the industrial robot jig includes a remaining battery indicator configured to display or transmit remaining power of the battery and an air pressure indicator configured to display and transmit a pressure of the auxiliary air tank.

4. The compressed air-based autonomous power generation system of claim 3, further comprising:

a router configured to receive and transfer information about the remaining power of the battery and the pressure of the auxiliary air tank;

a mobile device configured to receive the information about the remaining power of the battery and the pressure of the auxiliary air tank; and a monitoring computer configured to receive and monitor the information about the remaining power of the battery and the pressure of the auxiliary air tank.

5. The compressed air-based autonomous power generation system of claim 4, wherein the controller is configured to transmit a notification signal to the mobile device and the monitoring computer when the remaining power of the battery or the pressure of the auxiliary air tank is smaller than a first reference value.

6. The compressed air-based autonomous power generation system of claim 1, wherein the industrial robot jig includes a solenoid block connected with the battery and the compressed air-based power generator to determine whether to deliver the compressed air with the power from the battery and at least one pneumatic actuator connected with the solenoid block to determine whether to clamp the product.

7. The compressed air-based autonomous power generation system of claim 1, further comprising a welding robot configured to weld the product clamped by the industrial robot jig.

* * * * *